United States Patent
Lindner et al.

(10) Patent No.: US 6,968,191 B2
(45) Date of Patent: Nov. 22, 2005

(54) SYSTEM AND METHOD FOR TRAFFIC CHANNEL DORMANCY IN WIRELESS COMMUNICATION SOCKET MODE

(75) Inventors: Mark Lindner, Aliso Viejo, CA (US); Russell Sanders, San Diego, CA (US)

(73) Assignee: QUALCOMM INC, San Diego, CA (US)

( * ) Notice: Subject to any disclaimer, the term of this patent is extended or adjusted under 35 U.S.C. 154(b) by 507 days.

(21) Appl. No.: 09/994,189

(22) Filed: Nov. 26, 2001

(65) Prior Publication Data

US 2003/0100310 A1 May 29, 2003

(51) Int. Cl.[7] .............................................. H04Q 7/20
(52) U.S. Cl. .................. 455/450; 455/452.1; 455/574; 455/557; 455/343.2; 455/343.4; 455/418
(58) Field of Search .............................. 455/450, 452.1, 455/574, 557, 343.2, 343.4, 418, 423, 455, 455/516, 517

(56) References Cited

U.S. PATENT DOCUMENTS

| | | | | |
|---|---|---|---|---|
| 5,832,384 | A | * | 11/1998 | Balachandran et al. ...... 455/450 |
| 5,903,851 | A | * | 5/1999 | Backstrom et al. .......... 455/557 |
| 6,088,600 | A | | 7/2000 | Rasmussen ................. 455/574 |
| 6,469,995 | B1 | * | 10/2002 | Voyer et al. ................ 370/331 |
| 6,519,233 | B1 | * | 2/2003 | Gutierrez .................... 370/320 |
| 6,594,241 | B1 | * | 7/2003 | Malmlof ...................... 370/329 |
| 6,658,249 | B1 | * | 12/2003 | Hietalahti et al. ........ 455/422.1 |
| 6,665,307 | B1 | * | 12/2003 | Rydnell et al. ............. 370/437 |
| 6,747,965 | B1 | * | 6/2004 | Nara et al. .................. 370/335 |
| 6,801,785 | B2 | * | 10/2004 | Motoyoshi .................. 455/522 |
| 2001/0024431 | A1 | | 9/2001 | Koo et al. |
| 2001/0036831 | A1 | * | 11/2001 | Rezaiifar et al. ........... 455/455 |
| 2002/0082032 | A1 | * | 6/2002 | Hunzinger .................. 455/510 |
| 2002/0091831 | A1 | * | 7/2002 | Johnson ...................... 709/227 |
| 2002/0160812 | A1 | * | 10/2002 | Moshiri-Tafreshi et al. 455/561 |
| 2002/0177461 | A1 | * | 11/2002 | Rosen et al. ................. 455/518 |
| 2004/0125933 | A1 | * | 7/2004 | Jun et al. ............... 379/202.01 |
| 2005/0021600 | A1 | * | 1/2005 | Lagosanto et al. .......... 709/203 |

FOREIGN PATENT DOCUMENTS

| | | |
|---|---|---|
| EP | 0332825 | 9/1989 |
| WO | 0001173 | 1/2000 |
| WO | 0167786 | 9/2001 |
| WO | 0176180 | 10/2001 |

* cited by examiner

Primary Examiner—Sonny Trinh
Assistant Examiner—Huy Phan
(74) Attorney, Agent, or Firm—Philip R. Wadsworth; Robert J. O'Connell; John L. Ciccozzi

(57) ABSTRACT

In a wireless communication system such as a CDMA system, a traffic channel supporting two applications running in socket mode on a mobile station is allowed to go dormant and is released when respective idle periods associated with each socket expire, i.e., when there is no transmission over the traffic channel for the longer of two potentially unequal idle periods.

13 Claims, 1 Drawing Sheet

SYSTEM AND METHOD FOR TRAFFIC CHANNEL DORMANCY IN WIRELESS COMMUNICATION SOCKET MODE

FIELD OF THE INVENTION

The present invention relates generally to managing a traffic channel in wireless communication systems.

BACKGROUND OF THE INVENTION

Wireless communication systems such as code division multiple access (CDMA) systems use several channels to effect communication between wireless devices, also referred to as "mobile stations". One of the channels is the traffic channel, which carries the actual voice or data information that is being exchanged. In the case of data information, software applications can use a mobile station to communication with other devices through a wireless telephony infrastructure.

For instance, in one use a mobile station can be connected to a laptop computer, and applications running on the computer can communicate to external computing components by means of the traffic channel provided by the mobile station. A mobile station operating in this fashion is said to be operating in "packet mode", and is essentially functioning simply as a wireless modem.

Software applications can also be executed by a processor within the mobile station itself, however. This is increasingly the case, as wireless telephones and other wireless communication devices become more sophisticated. The communication capability of the mobile station can be used by such applications to communicate with external computing components. A mobile station in this case is said to be operating in "socket mode". In this case, much of the communication protocol functions that otherwise would be handled by a laptop when the mobile station is in the packet mode must be handled by the mobile station itself, requiring additional software referred to as Digital Mobile Station Software (DMSS).

Currently, mobile stations operating in socket mode have no way to idle a traffic channel. Stated differently, if the communication requirements of a software application using a first logical communication port referred to as a "socket" on a mobile station are suspended for a time, the traffic channel nevertheless cannot be released for use by other resources. Moreover, the present invention makes the critical observation that simply allowing an application to release a traffic channel without regard to whether other applications that might be executing on the same mobile station are using the same channel could result in one application unwittingly terminating a traffic channel that is currently being used by another application. Having made these critical observations, the present invention provides the solutions set forth herein.

SUMMARY OF THE INVENTION

A method for managing traffic channel use in a wireless communication system includes establishing first and second communication connections in a wireless communication device, and establishing respective first and second idle periods for the first and second connections. A traffic channel that is associated with the first and second connections is released when both idle periods expire.

In a preferred implementation, the method includes resetting an idle period when a transmission or reception passes through the respective connection. The idle period of a socket/application can be set to a default value or it can be set by the associated application. The idle periods need not be equal to each other.

In another aspect, a wireless communication system includes a first application running in a socket mode and a second application running in a socket mode. The applications potentially require use of a common wireless traffic channel. In accordance with this aspect, the traffic channel is selectively allowed to go dormant in the absence of transmissions over the traffic channel.

In still another aspect, a computer program product includes means for associating a first idle period with a first connection, and means for associating a second idle period with a second connection. A wireless traffic channel can be established to both connections. Means are provided for releasing the traffic channel when the idle periods expire.

In yet another aspect, a method for managing a traffic channel associated with a wireless communication device and plural socket and/or packet connections includes enabling a traffic channel that is associated with plural applications to be released only when all applications that are associated with the traffic channel do not require the traffic channel.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
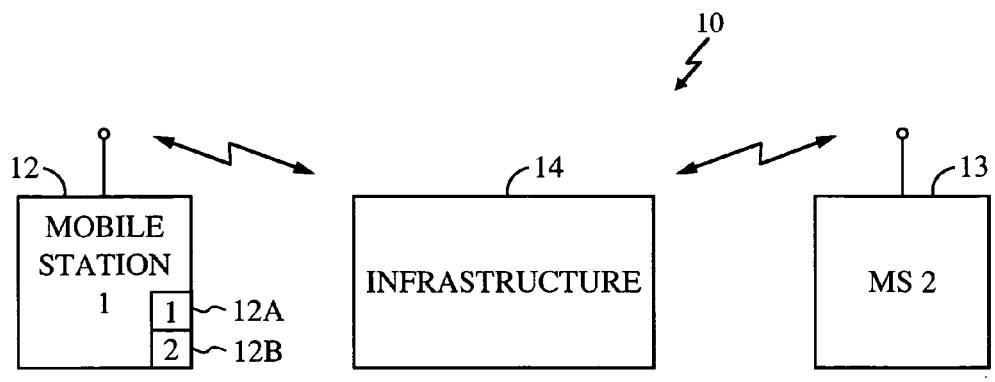
FIG. 1 is a simplified block diagram showing the system architecture.
Figure 2:
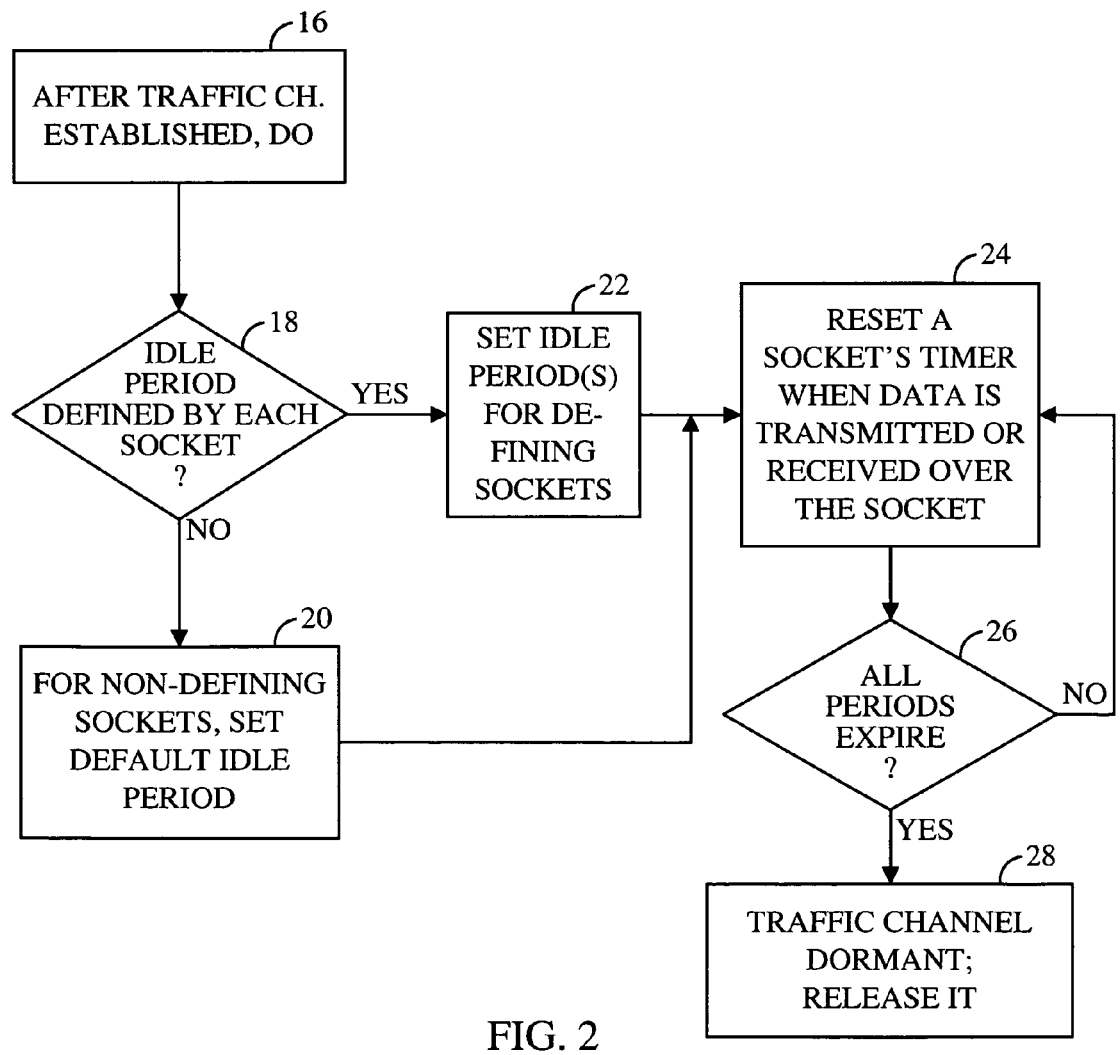
FIG. 2 is a flow chart of the present logic.

Referring initially to FIG. 1, a system is shown, generally designated 10, for effecting communication between a first wireless communication device 12, referred to herein as a "mobile station", and a computing device 13, such as but not limited to another wireless communication device, through a telephony infrastructure 14.

As envisioned by the present invention, the mobile station 12 can include plural software applications, shown in FIG. 1 as first and second applications 12a, 12b. The applications 12a, 12b communicate with the external computing device 13 using respective communication "sockets" of the mobile station 12. While for simplicity of disclosure only two applications 12a, 12b are shown, it is to be understood that more than two applications are contemplated by the principles of the present invention.

The infrastructure 14 can include, e.g., base stations (BTS), base station controllers (BSC), and additional infrastructure in accordance with wireless communication principles known in the art.

In accordance with the present invention, the system 10 uses spread spectrum techniques. Accordingly, the mobile station 12 can use an over the air (OTA) protocol such as CDMA or WCDMA to communicate with the infrastructure 14. In one non-limiting embodiment the mobile station 12 is a mobile telephone made by Kyocera, Samsung, or other manufacturer that uses Code Division Multiple Access (CDMA) principles and CDMA over-the-air (OTA) communication air interface and includes protocols such as defined in but not limited to IS-95A, IS-95B, WCDMA, IX, IXCV, EV and DV, IS-2000, and others to communicate with the infrastructure 14.

For instance, the wireless communication systems to which the present invention can apply, in amplification to those noted above, include Personal Communications Service (PCS) and the following digital systems: CDMA, WCDMA, and hybrid Time Division Multiple Access (TDMA)/CDMA technologies. A CDMA cellular system is described in the Telecommunications Industry Association/Electronic Industries Association (TIA/EIA) Standard IS-95. Other communications systems are described in IS-98 and in the International Mobile Telecommunications System 2000/Universal Mobile Telecommunications Systems (IMT-2000/UM), standards covering what are referred to as wide-band CDMA (WCDMA), cdma2000 (such as cdma2000 1x or 3x standards, for example) or TD-SCDMA.

The present invention applies to any spread spectrum mobile station 12; for illustration it will be assumed that the mobile station 12 is a telephone. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

With the above overview of the present architecture in mind, it is to be understood that the present logic is executed in accordance with the flow charts discussed below by, e.g., the mobile station 12, and more particularly is embodied in the DMSS of the mobile station 12. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor or processors within one or more of the components shown as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Commencing at block 16, after a traffic channel has been established in accordance with wireless communication principles known in the art, it is determined at decision diamond 18 whether a respective idle period has been defined by each application 12a, 12b. Looked at another way, it is determined whether an idle period has been established for each respective socket associated with the MS 12.

If a particular application and/or socket has not defined its own idle period, a default period is assigned to that socket at block 20. Otherwise, the idle period that is self-defined by an application and/or socket is assigned at block 22. It is to be appreciated that the idle period associated with the first application 12a and/or its respective socket need not be identical to that associated with the second application 12b and/or its respective socket.

At block 24, in the event that a transmission or reception occurs through a socket, that socket's idle period is reset by resetting a timer that counts down the period. Decision diamond 26 represents a decision that is equivalent to a system state, namely, the state at which all socket idle periods have expired due to the associated timers having counted down without resetting by the condition at block 24. When this state is achieved, the logic proceeds to block 28 to return "traffic channel dormant" or otherwise release the traffic channel. In this way, the traffic channel is not released until all applications that might be running on the MS 12 are finished with it. These principles would apply equally to the packet mode, with the above logic being executed in the host computing device if desired instead of inside the MS 12 itself.

While the particular SYSTEM AND METHOD FOR TRAFFIC CHANNEL DORMANCY IN WIRELESS COMMUNICATION SOCKET MODE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A method for managing traffic channel use in a wireless communication system, comprising:

establishing at least first and second communication connections in at least a first wireless communication device;

establishing respective first and second idle periods for the first and second connections;

releasing a traffic channel associated with the first and second connections when both idle periods expire; and wherein the connections are socket connections.

2. A wireless communication system, comprising:

at least a first application running in a socket mode; and at least a second application running in a socket mode, the applications potentially requiring use of a common wireless traffic channel, the traffic channel being selectively allowed to go dormant in the absence of transmissions over the traffic channel.

3. The system of claim 2, wherein the traffic channel is released when it goes dormant.

4. The system of claim 2, wherein each socket mode is associated with a respective idle period, and the traffic channel goes dormant upon the expiration of at least one idle period.

5. The system of claim 4, wherein the traffic channel goes dormant upon the expiration of both idle periods.

6. The system of claim 5, wherein an idle period is reset when a transmission or reception passes through the respective socket.

7. The system of claim 6, wherein at least one idle period is set to a default value.

8. The system of claim 6, wherein at least one idle period is defined by the associated application.

9. The system of claim 6, wherein the idle periods are not equal to each other.

10. The system of claim 2, wherein the applications run on a wireless communication device.

11. A computer program product, comprising:

means for associating at least a first idle period with a first connection;

means for associating at least a second idle period with a second connection, a wireless traffic channel being establishable to both connections;

means for releasing the traffic channel when the idle periods expire;

wherein the connections are socket connections or packet connections; and further comprising means for resetting an idle period when a transmission or reception passes through the respective socket.

12. The computer program product of claim 11, comprising means for setting at least one idle period to a default value.

13. The computer program product of claim 11, wherein the first idle period is not equal to the second idle period.

* * * * *